Dec. 11, 1934.  H. B. LUYSTER  1,983,912
HORN CONTROL DEVICE
Filed Oct. 30, 1933  3 Sheets-Sheet 1

Inventor
H. B. Luyster
By Clarence A. O'Brien
Attorney

Dec. 11, 1934.  H. B. LUYSTER  1,983,912
HORN CONTROL DEVICE
Filed Oct. 30, 1933    3 Sheets-Sheet 2

Inventor
H. B. Luyster
By Clarence A. O'Brien
Attorney

Dec. 11, 1934.          H. B. LUYSTER          1,983,912
                      HORN CONTROL DEVICE
              Filed Oct. 30, 1933        3 Sheets-Sheet 3
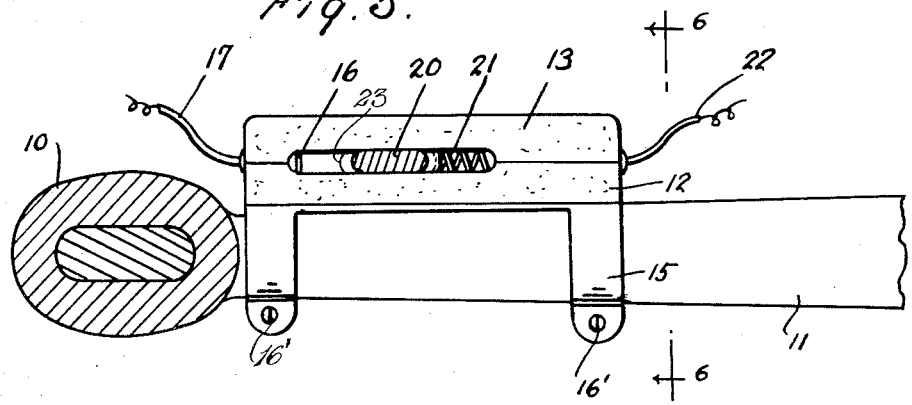
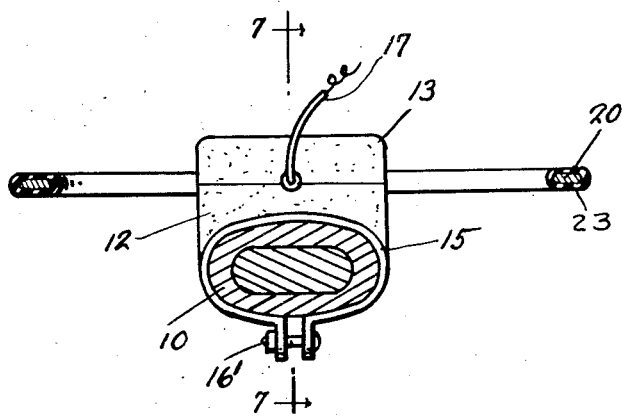
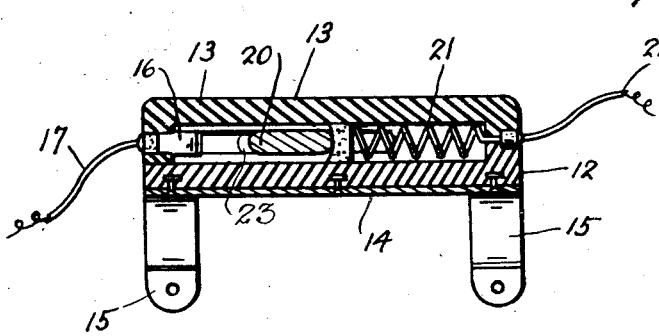
Inventor
H. B. Luyster
By *Clarence A. O'Brien*
                              Attorney Patented Dec. 11, 1934

1,983,912

UNITED STATES PATENT OFFICE 1,983,912

HORN CONTROL DEVICE

Homer Blair Luyster, Black Diamond, Wash.

Application October 30, 1933, Serial No. 695,906

1 Claim. (Cl. 200—59)

This invention has as its object the provision of means to facilitate the controlling or sounding of the horn or similar signal on an automobile, and consists in the provision of a device for controlling the circuit to the horn, and which can be readily mounted on the steering wheel of the automobile to be grasped by the hand of the operator and operated during the steering of the vehicle for closing the circuit to the horn to sound the latter.

The invention together with its objects and advantages will be best understood from a study of the following description taken in connection with the accompanying drawings wherein:

Figure 5 is an enlarged sectional elevational view for clearly illustrating the invention.

Figure 6 is a sectional view taken substantially on the line 6—6 of Figure 5, and Figure 7 is a sectional view taken substantially on the line 7—7 of Figure 6.

Figure 1:
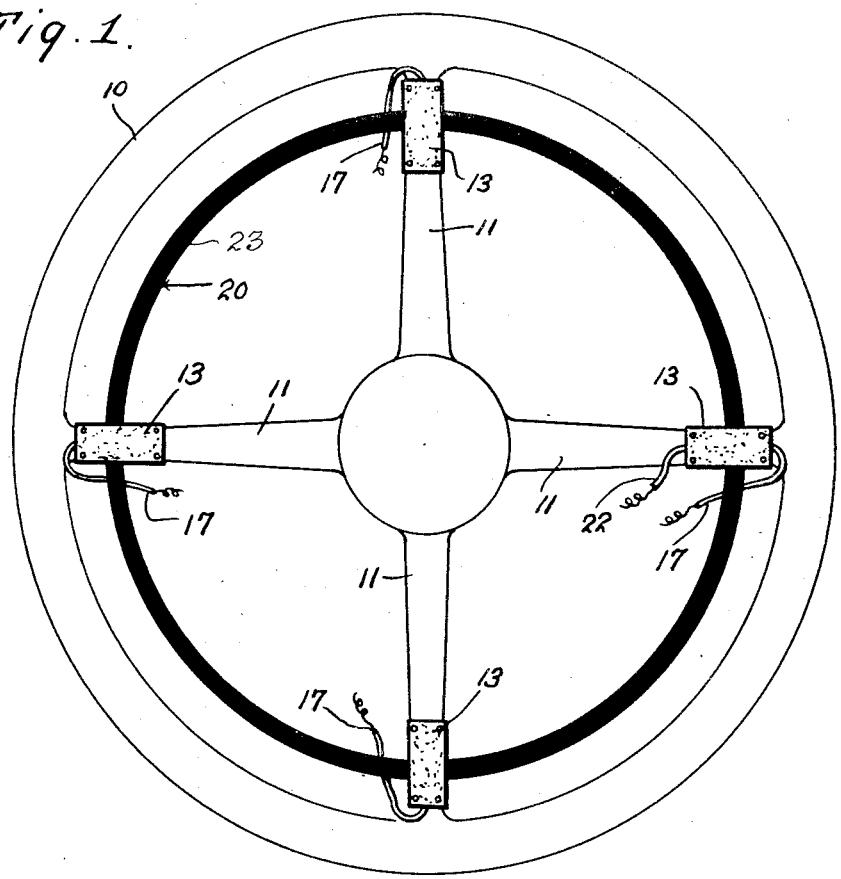
Figure 1 is a top plan view illustrating the application of the invention to the steering wheel of an automobile.
Figure 3:
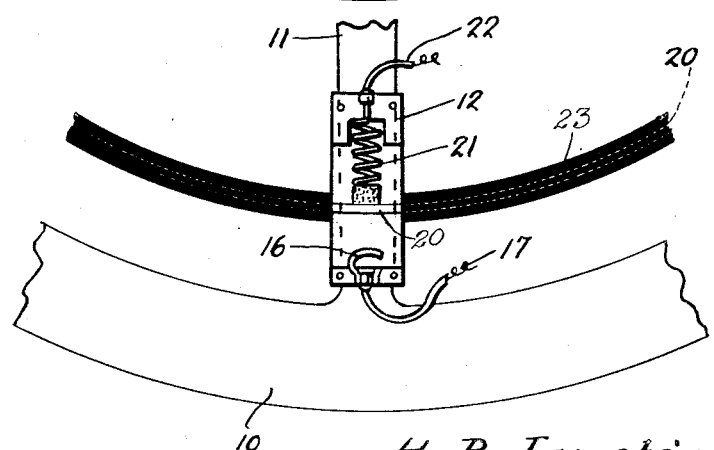
Figure 3 is a fragmentary plan view with certain parts removed.
Figures 2, 4:
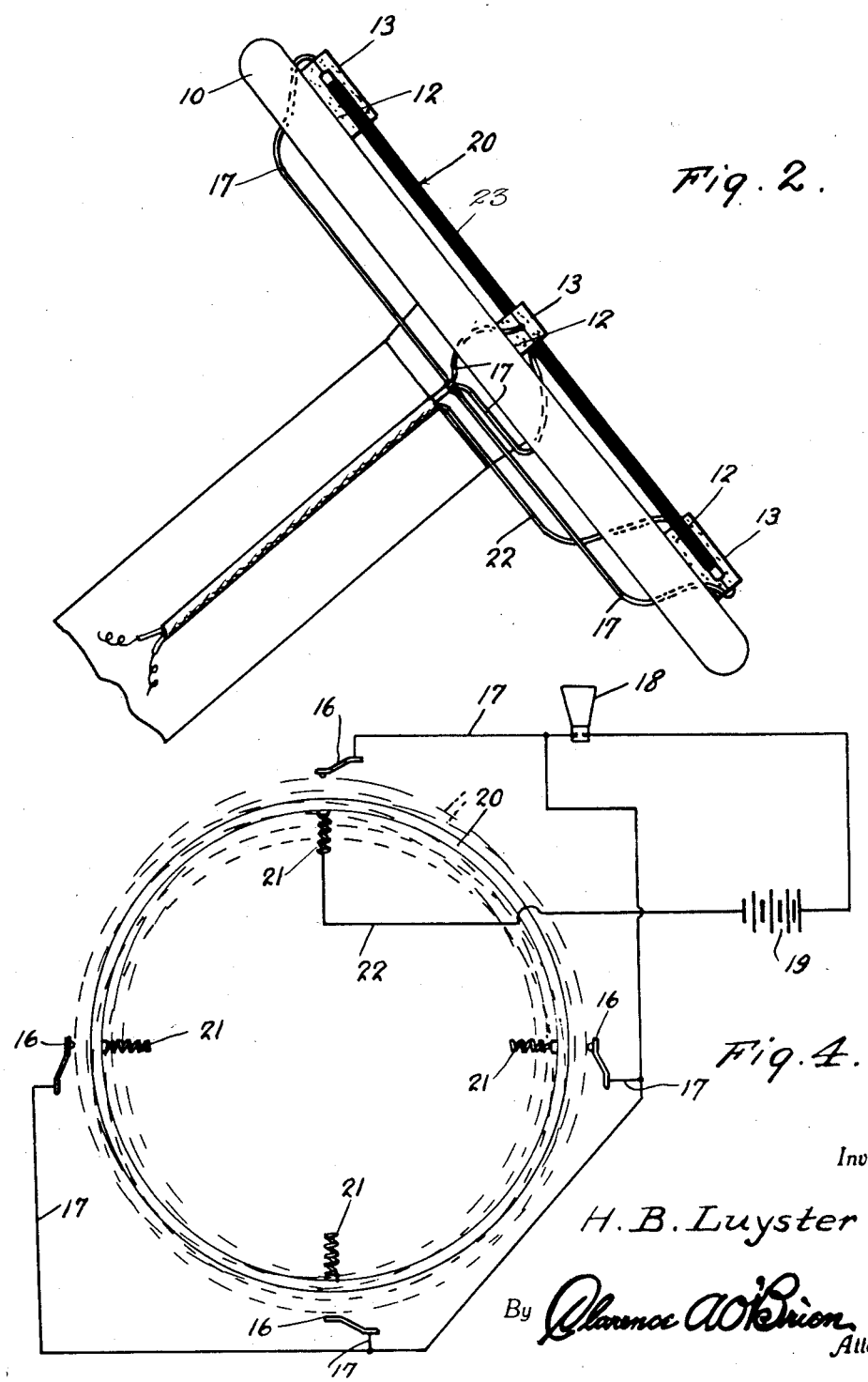
Figure 2 is a side elevational view thereof.
Figure 4 is a diagrammatic view.

Referring to the drawings by reference numerals it will be seen that the steering wheel of the vehicle is of conventional construction including the usual rim 10 and spokes 11.

In accordance with the present invention there is mounted on each of the spokes 11 adjacent the rim 10 a block of insulating material the same being divided to provide a body section 12 and a top section 13. The body section 12 is secured to a plate 14 having coacting spring jaws 15 adjacent each end thereof that embrace the spoke 11 and are secured in engagement therewith by bolts 16'. The confronting faces of the block sections 12, 13 are suitably recessed, and at one end said sections are suitably formed to accommodate a spring contact 16 that extends into said recess. The contacts 16 are connected by suitable wires 17 in the horn circuit which includes the horn 18 and a suitable source of current supply, in the present instance a battery 19.

A contact ring 20 has portions thereof operating in the recesses formed between the confronting faces of the sections 12, 13 and springs 21 are arranged in said recesses and engage with the ring for yieldably retaining the ring centered and out of engagement with the contacts 16. The ring 20 is arranged in the horn circuit through the medium of a wire 22 which is electrically connected at one end with one of the springs 21. The portions of the ring 20 extending between the spokes 11 are covered with a suitable sheathing 23 of insulating material.

From the above detailed description it will be apparent that normally the ring 20 is out of engagement with the contacts 16 for interrupting the circuit to the horn 18. When however pressure is applied to the ring 20 for drawing the same toward the rim 10 of the steering wheel said ring in moving under the influence of said pressure will move into engagement with the proper one of the contacts 16 thus closing the circuit to the horn 18 for sounding the latter. Immediately upon release of such pressure the ring 20 will return to its normal position.

It will thus be seen that a sounding of the horn may be readily accomplished by the operator of the vehicle without removing his hands from the steering wheel 10 thus enabling the operator to have full control of the vehicle while sounding the horn. It will of course be of great aid to the operator when negotiating a turn, permitting him while making the turn to continuously sound the horn while at the same time have both hands engaged with the steering wheel.

It will also be understood that the wires may be trained through the hollows of the rim 10, the spokes 11 and the post of the steering wheel; and that also if desired the blocks may be mounted between the spokes within the confines of the rim 10 of the steering wheel and the spokes of the wheel suitably slotted to accommodate the ring 20.

Having thus described my invention, what I claim as new is:

In combination with a steering wheel, a plurality of radially extending blocks of insulating material supported by the wheel and spaced inwardly of the rim thereof, each block having an elongated chamber therein, and each block having elongated openings in its sides communicating with the chamber, a metal ring of less diameter than the rim of the wheel and having portions passing through the openings of the blocks, whereby the ring is slidably supported by the blocks for movement in its own plane, a spring in the inner part of each chamber contacting the ring, said springs holding the ring concentric to the rim of the wheel, and a spring contact in the outer end of each chamber, said ring being adapted to be moved manually into engagement with a spring contact to close a circuit.

HOMER BLAIR LUYSTER.